United States Patent

[11] 3,623,761

[72] Inventor Rudolph E. Nadherny
 Naperville, Ill.
[21] Appl. No. 51,646
[22] Filed July 1, 1970
[45] Patented Nov. 30, 1971
[73] Assignee Illinois Railway Equipment Company
 Chicago, Ill.

[54] LOCKING PLATE FOR CAPSCREWS HOLDING ROLLER BEARING END CAP TO THE OUTER END OF AN AXLE JOURNAL
 20 Claims, 13 Drawing Figs.

[52] U.S. Cl. .................................................. 295/36 R
[51] Int. Cl. .................................................. B62d 27/00
[50] Field of Search ............................................. 151/53;
 295/36; 308/180

[56] References Cited
 UNITED STATES PATENTS
 1,113,344 10/1914 Hodges ......................... 151/53
 1,179,305 4/1916 Harding ........................ 151/53

Primary Examiner—Martin P. Schwadron
Assistant Examiner—Frank Susko
Attorney—Robert R. Lockwood ABSTRACT: A spring steel centrally bowed and apertured locking plate has three radially extending arms for locking engagement with the hexagonal heads of three equiangularly spaced capscrews securing an end cap of a roller bearing to the outer end of a railway car axle journal. The locking plate is held in place by a grease fitting extending through the aperture and threaded into the end cap. In one embodiment the arms are arranged to bear against the flat sides of the heads of the capscrews and to overlie them with radially extending wedge-shaped leaves therebetween for locating the locking plate with respect to these heads. In another embodiment the arms are wedge shaped with their radial edges upturned to bear against the flat sides of the heads of the juxtaposed pair of capscrews. The upturned edges are serrated for locking engagement with corners of the hexagonal heads and a tab extends from the central section to lock the grease fitting. In a further embodiment short arms intermediate the radial arms also lock the capscrews.

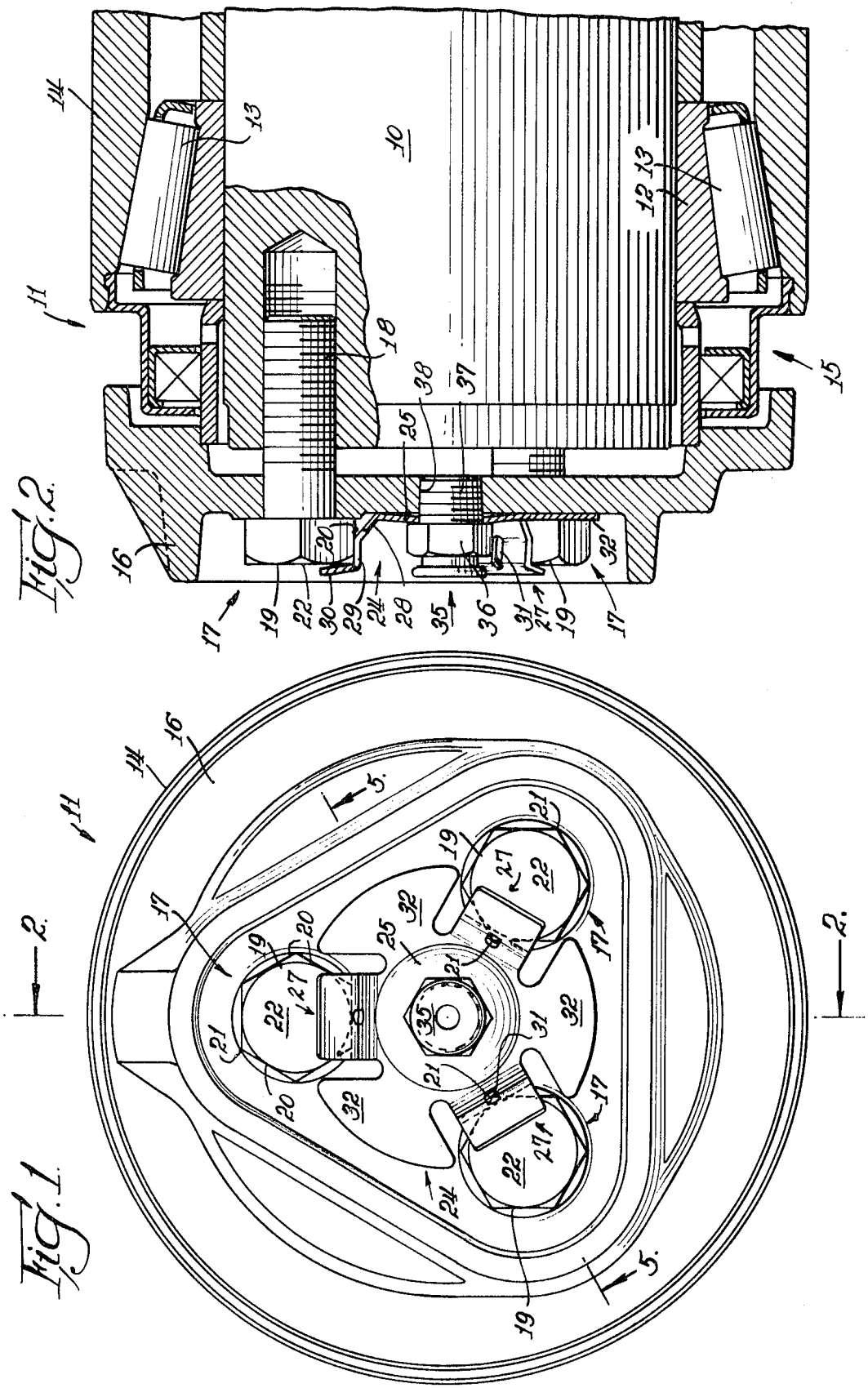

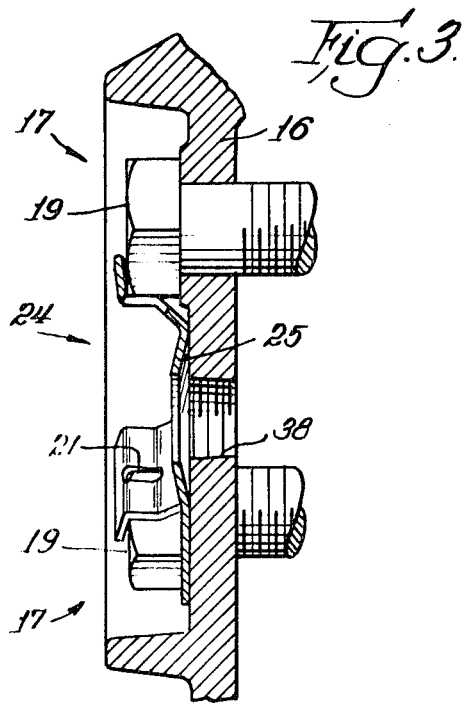
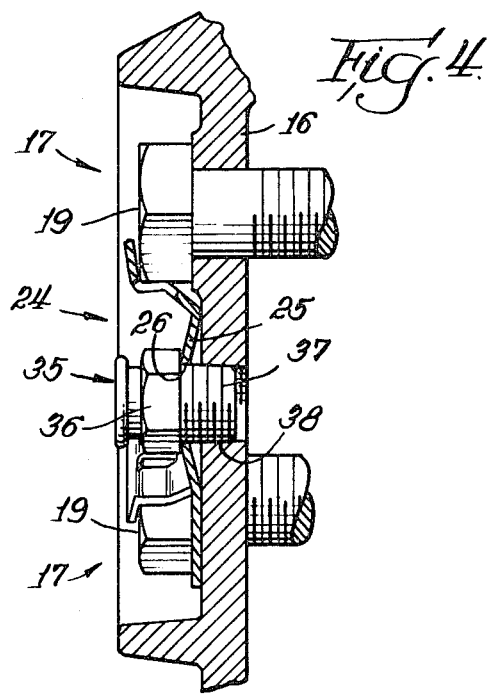
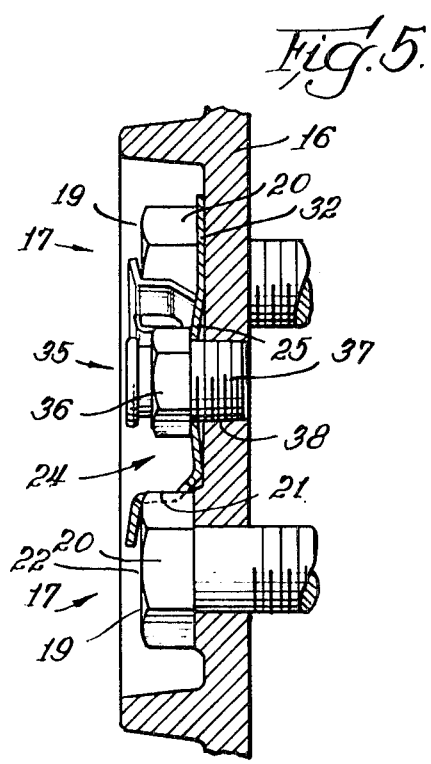
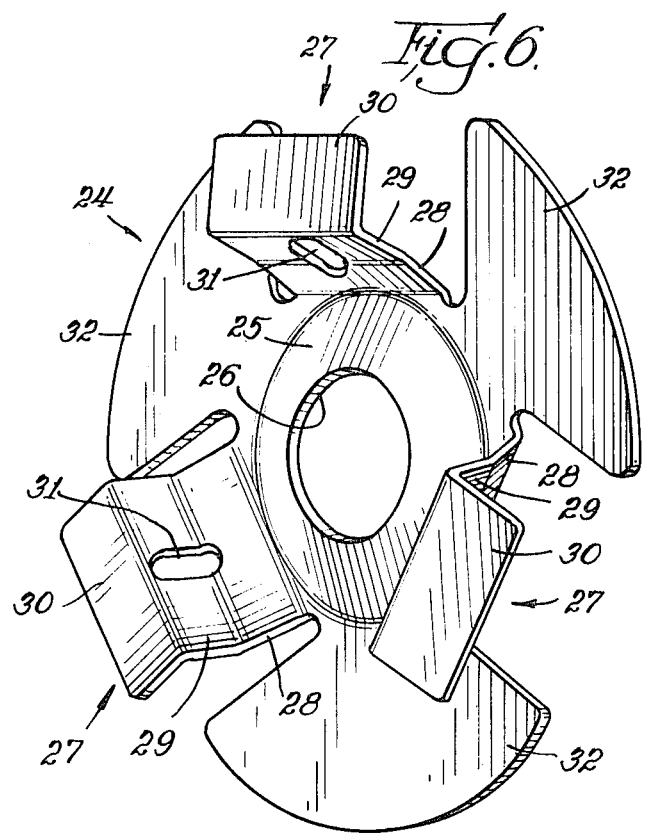

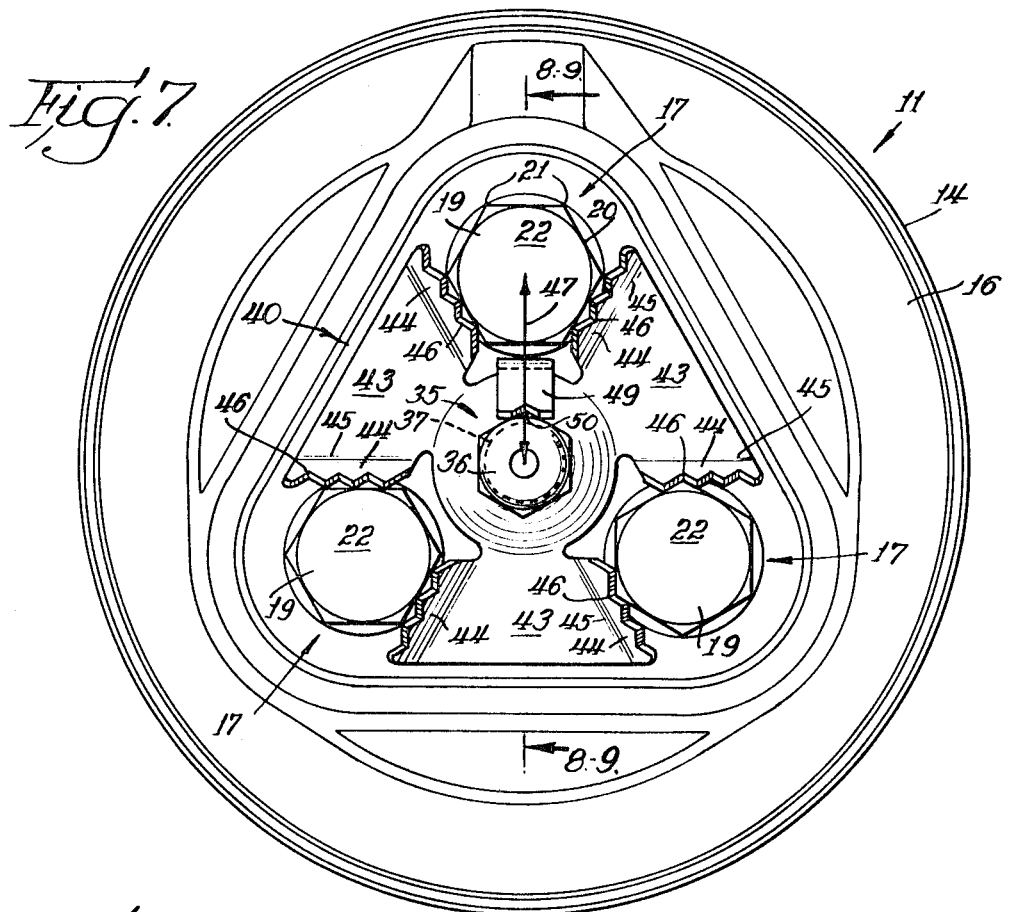
Fig. 7
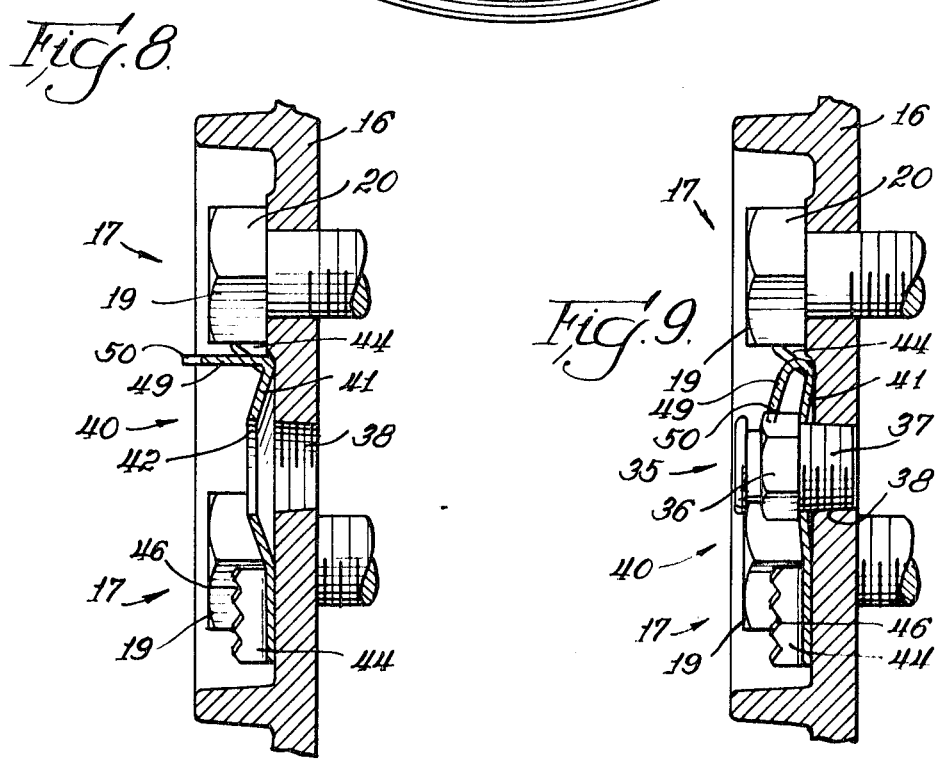
Fig. 8.
Fig. 9.

LOCKING PLATE FOR CAPSCREWS HOLDING ROLLER BEARING END CAP TO THE OUTER END OF AN AXLE JOURNAL

As described at pages 34–38 of the WHEEL AND AXLE MANUAL of the A.A.R., Eighth Edition, Supplement No. 1, effective Nov. 1, 1966, a triangular locking plate has been utilized to prevent accidental removal of the three capscrews used to hold the end cap of a roller bearing assembly to the outer end of its axle journal. The capscrews extend through apertures at the corners of the locking plate. Tabs integral with the locking plate at these corners are intended to be deformed against the sides of the heads of the capscrews to prevent loosening thereof. This locking plate is limited in its effectiveness due to the failure of operating personnel to bend the tabs, as instructed, and also because of the extreme vibration of the unsprung thread seats of the capscrews. Since the capscrews are threaded into the outer end of the axle journal which is unsprung, all rail joint shocks are transmitted directly from the wheel through the axle and into the capscrews which are employed to hold the roller bearing end cap in position. Further, lateral motion of the car trucks, due to car body motion, places considerable stretch load on the capscrews which induce a loosening tendency.

Among the objects of this invention are: To provide for locking the three equiangularly spaced capscrews holding the end cap of a roller bearing assembly in place on the outer end of an axle journal in a new and improved manner; for this purpose to provide a locking plate that is secured to the end cap directly and has radial arms for bearing against the hexagonal heads of the capscrews to hold them against turning; to arrange for the radial arms to bear against the flat sides of the heads of the capscrews and to overlie them; to guide the locking plate into position by providing radial wedge-shaped leaves between the arms for location between the heads of the capscrews; to form the locking plate of resilient metal with a raised and apertured central portion arranged to receive a threaded grease fitting for securing the locking plate to the end cap; to provide the locking plate with radially extending wedge-shaped arms arranged to bear against the flat sides of the heads of a juxtaposed pair of capscrews; to provide upturned flanges along the radial edges of the wedge-shaped arms for engaging these flat sides; to serrate these unturned flanges for locking engagement with corners of the hexagonal heads; to construct the locking plate such that a single size can be employed in conjunction with the range of sizes of roller bearing assemblies commonly in service; and to provide short locking arms for the capscrews between the radial arms.

In the drawings:

FIG. 1 is a view in end elevation of a roller bearing assembly mounted on an axle journal in which one embodiment of the locking plate of this invention is incorporated.

FIG. 2 is a vertical sectional view taken generally along line 2—2 of FIG. 1 and shows a portion of the outer end of the axle journal and a portion of the roller bearing assembly.

FIGS. 3, 4 and 5 are sectional views taken generally along line 5—5 of FIG. 1 to show various stages in the application of the locking plate to the capscrews.

FIG. 6 is a perspective view of the locking plate shown in the preceding FIGS.

FIG. 7 is a view, similar to FIG. 1, showing a modified form of locking plate.

FIGS. 8 and 9 are vertical sectional-views taken generally along line 8—8 and 9—9 of FIG. 7 to show the different stages in the application of the locking plate.

Figure 10:
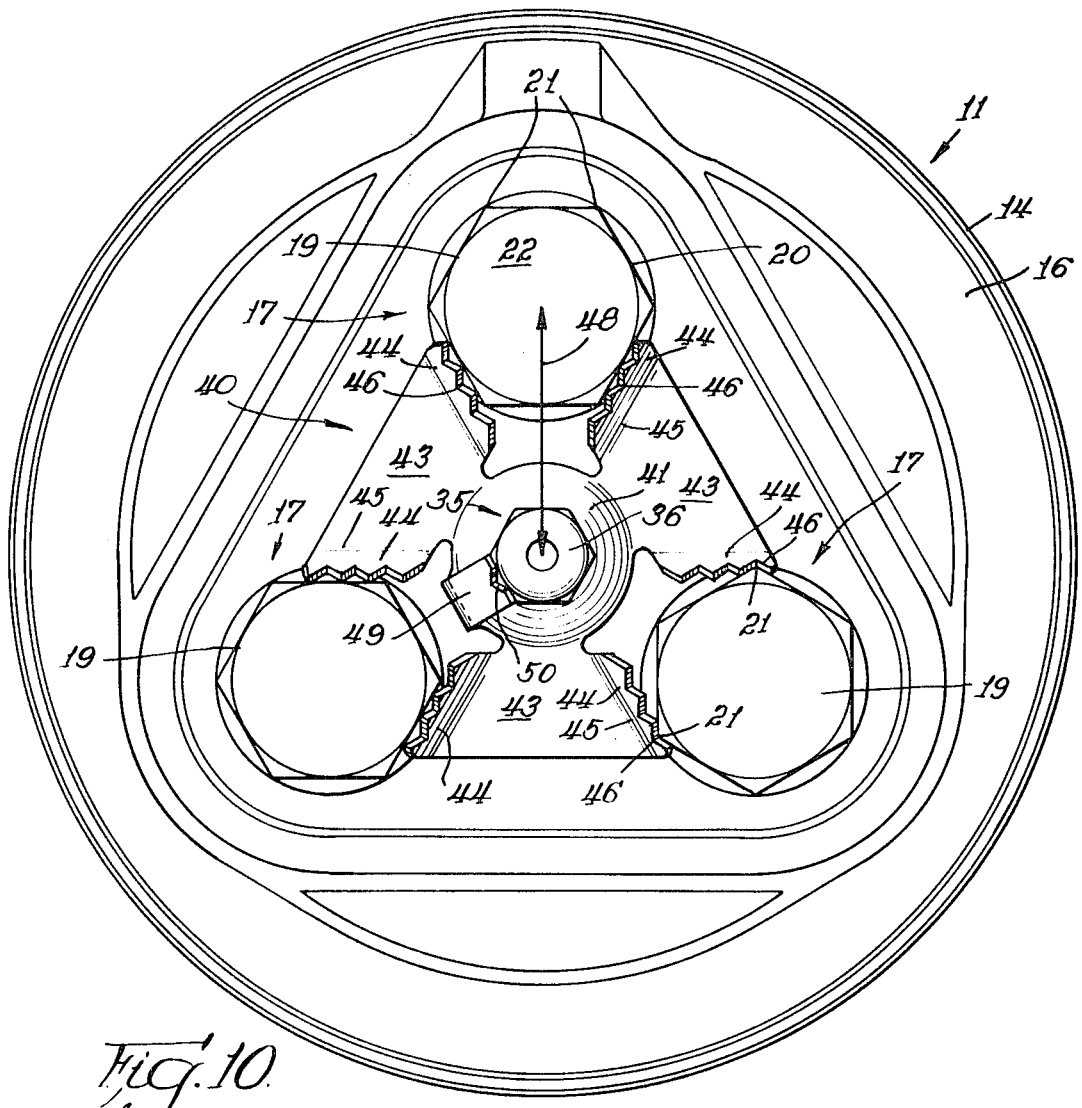

FIG. 10 is a view, similar to FIG. 7, showing the application of the locking plate illustrated in FIG. 7 to a roller bearing assembly the capscrews of which are located at a substantially greater radius than is shown in FIG. 7.

Figure 11:
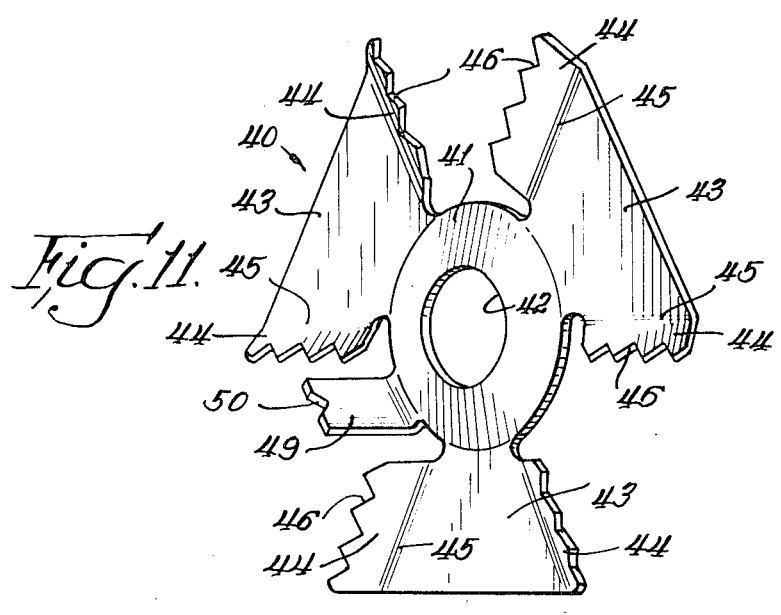

FIG. 11 is a perspective view of the locking plate shown in FIGS. 7–10.

Figure 12:
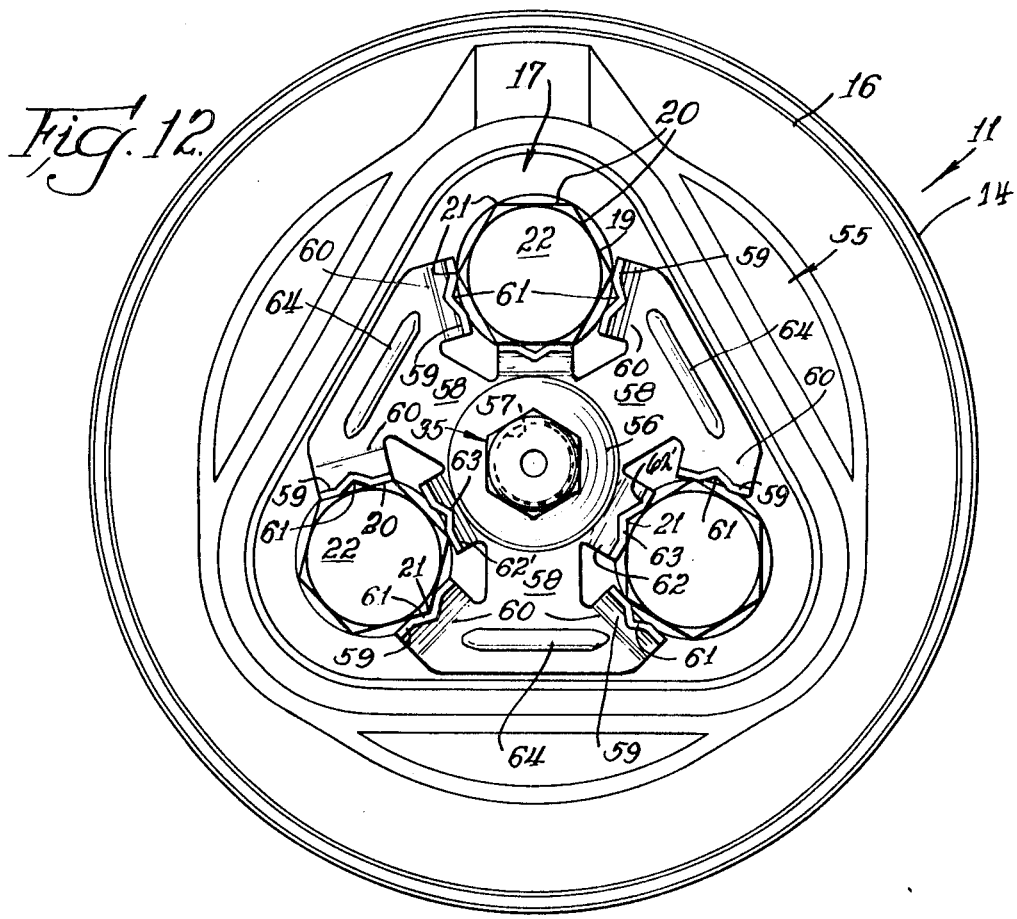

FIG. 12 is a view, similar to FIG. 1, showing a further modification.

Figure 13:
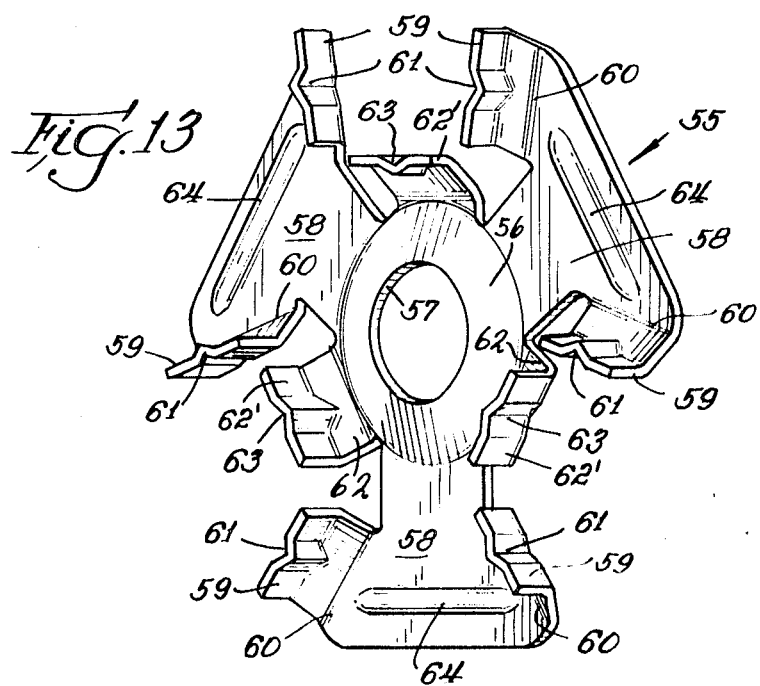

FIG. 13 is a perspective view of the locking plate shown in FIG. 12.

In FIGS. 1–2 the reference character 10 designates, generally, a portion of an axle journal having a roller bearing assembly mounted thereon a portion of which is indicated, generally, at 11. The roller bearing assembly 11 includes a roller bearing cone 12 surrounded by rollers 13 which are located within an enclosure collar 14 that is suitably mounted in a journal box, not shown. The outer end of the roller bearing assembly 11 is provided with a seal 15 to contain a lubricant, the seal 15 being held in place by an end cap 16. It is conventional to secure the end cap 16 to the outer end of the axle journal 10 by capscrews one of which is shown at 17 in FIG. 2. The capscrews 17 are threaded at 18 into the outer end of the axle journal 10 for holding the end cap 16 in place. Since the capscrews 17 are threaded into the axle journal 10 they are subject to all of the shocks to which the axle journal 10 is subjected during movement of the railway car.

The capscrews 17 are of conventional construction with hexagonal heads 19 having flat sides 20 with corners 21 therebetween, A flat end 22 interconnects the flat sides 20.

Since the capscrews 17 are likely to become loosened during the operation of the railway car, it is essential that means be provided for preventing them from turning from the positions to which they are tightened in accordance with established torque values. For this purpose, as shown more clearly in FIG. 6, a locking plate, indicated generally at 24, is provided. The locking plate 24 is formed of a one-piece spring steel pressing provided with a raised central portion 25 which functions like a Belleville washer. The raised central portion 25 has a central aperture 26 that is employed for receiving securing means for holding the locking plate 24 to the end cap 16 in a manner to be described. Radial arms 27 extend from the central portion 25. Each of the radial arms 27 includes a lateral extension 28 and a flat section 29 which, as shown in the upper portion of FIG. 1 and in FIG. 2, is arranged to bear against a flat side 20 of the hexagonal head 19 of one of the capscrews 17. Each of the arms 27 also includes an outstanding distal end 30 from the flat section 29 that is arranged to overlie the flat end 22 of the respective capscrew 17 as shown in FIGS. 1 and 2.

Since it is likely that the tightened positions of the capscrew 17 may vary as indicated in FIG. 1, then the flat side 20 may not be presented to have engagement with the respective flat section 29. Rather, as shown in FIG. 1, the corners 21 of the hexagonal heads 19 of the lower two capscrews 17 may be in alignment centrally with the respective flat section 29. To accommodate this situation a recess 31 in the form of an oblong opening, is provided in each of the flat sections 29 in which the respective corner 21 can be received in locking engagement.

In order to facilitate proper location of the locking plate 24 with reference to the heads 19 of the capscrews 17 wedge-shaped leaves 32 extend radially from the central portion 25 of the locking plate 24 and between the radial arms 27. As shown in FIG. 1 the wedge-shaped leaves 32 serve to properly position the locking plate 24 with respect to the heads 19 of the capscrews 17.

In accordance with this invention the locking plate 24 is secured to the end cap 16 independently of the capscrews 17. For this purpose a threaded member in the form of a grease fitting 35 is employed. The threaded member 35 can be the conventional grease fitting that is employed as a conventional part of the roller bearing assembly 11. It has a hexagonal head 36 and a threaded end 37 which extends through the central aperture 26 in the locking plate 24 and, as shown in FIG. 2, is screwed into a threaded opening 38 centrally located in the end cap 16.

In assembling the end cap 16 in place on the outer end of the axle journal 10, the capscrews 17 are applied and are tightened to the prescribed torque requirements. Preferably the final positions of the heads 19 is as illustrated in FIG. 1, it being understood that all of the flat sides 20 can be positioned for flatwise engagement with the respective flat section 29 or all of the corners 21 may be positioned for locking engagement with the respective recesses 31. Next the locking plate 24 is applied as illustrated in FIG. 3 with the raised central portion 25 at its maximum distance from the juxtaposed outer surface of the end cap 16. Next the threaded member 35 in the form of a grease fitting is inserted through the central opening 26 as illustrated in FIG. 4 with the end 37 being threaded in the opening 38 in the end cap 16. Finally the hexagonal head 36 has the prescribed torque applied thereto for the purpose of locking the locking plate 24 in the locked position as shown in FIG. 5. Since the end cap 16 is not an integral part of the axle journal 10 and since the threaded member 35 is secured to the end cap 16 there is less likelihood that the threaded member 35 will become loosened. In its tightened position it securely holds the hexagonal heads 19 of the capscrews 17 against turning. There are no tabs to be turned up or other operation required which is likely to be overlooked by operating personnel in completing the assembly of the roller bearing 11.

In FIGS. 7–11 there is illustrated another embodiment of locking plate construction. Referring particularly to FIG. 11 it will be observed that the reference character 40 designates, generally, a locking plate that preferably is formed of spring steel. It has a raised central portion 41 to provide a Belleville washer construction. The central portion 41 has a central aperture 42 for receiving the threaded member 35 in the form of a grease fitting for holding the locking plate 40 in position on the end of an axle journal, such as the axle journal 10 shown in FIG. 2. Radial arms 43 extend from the central portion 41 for positioning between juxtaposed pairs of capscrews 17 as shown in FIGS. 7 and 10. Upstanding flanges 44 extend along radial edges 45 of the arms 43 and they are arranged to bear against the flat sides 20 of the hexagonal heads 19 of the capscrews 17.

While the capscrews 17 can be tightened to the prescribed torque and to the positions shown in FIGS. 7 and 10, they may be tightened to positions as shown in the lower portion of FIG. 1 where the corners 21 of the hexagonal heads 19 are located at right angles to the upstanding flanges 44 or in locations approaching these positions. In order to provide locking engagement with the corners 21 the upstanding flanges 44 are provided with serrations 46 for receiving the corners 21 and holding the capscrews 17 against turning.

After the capscrews 17 have been applied to the manner previously described to hold the end cap 16 in place as shown in FIGS. 7 and 10, the locking plate 40 is applied as illustrated in FIG. 8. The central opening 42 is in alignment with the threaded opening 38 in the end cap 16 and the raised central portion 41 is in the unstressed position. Finally the threaded member in the form of a grease fitting 35 is inserted, as shown in FIG. 9, through the central aperture 42 and the end 37 is threaded into the opening 38 in the end cap 16. The raised central portion 41 is stressed to an extent that is determined by the prescribed torque for tightening the threaded member 35. Because of the stressed central portion 41 in a manner described, the threaded member 35 is held against loosening in the same manner that the threaded member 35 is held against loosening when it is tightened to the position shown in FIG. 5. Also, the locking plate 40 is securely held in position. Because the threaded member 35 is screwed into the end cap 16, the vibrations incident to movement of the axle journal 10 are not directly transmitted to the locking plate 40 and to the threaded member 35. Thus there is little likelihood that the threaded member 35 will become loosened.

A comparison of FIGS. 7 and 10 shows that the same locking plate 40 is employed in both instances. However the capscrews 17 are located at a radius indicated at 47 in FIG. 7 which is substantially shorter than radius 48 in FIG. 10. In FIG. 7 the upstanding flanges 44 extend somewhat beyond the respective flat sides 20 of the hexagonal heads 19 of the capscrews 17 there shown. In FIG. 10 the upstanding flanges 44 of the locking plate 40 having the same dimensions, extend somewhat less than fully along the entire width of the flat sides 20 of the capscrews 17. Thus it is necessary to stock only one size of locking plate 40 for the range of sizes of roller bearing assemblies commonly in service.

In FIGS. 7 and 10 it will be observed that the lower right head 19 is shifted so as to bring two of the corners 21 into locking engagement with the serrations 46 at the distal ends of the respective flanges 44. It will be understood that the other hexagonal heads 19 can be similarly located and still the necessary locking relationship is provided. This makes it unnecessary to position accurately the hexagonal heads 19 with the flat sides 20 in parallelism with the respective upstanding flanges 44.

While the Bellville washer effect provided by the raised central portion 41 ordinarily is sufficient to prevent loosening of the threaded member 35 in the form of a grease fitting, it may be desirable that mechanical locking means be provided therefor. Accordingly, as shown more clearly in FIG. 11 a tab 49 is formed from the raised central portion 41 between a pair of the radial arms 43 with a notch 50 in its distal end. After the locking plate 40 has been applied in the manner previously described and illustrated in FIGS. 7 and 10, the tab 49 is deformed, as shown in FIG. 9, with the notch 50 in engagement with the juxtaposed corner of the hexagonal head 36. Alternately, the flat distal end of the tab 49 can engage a flat side of the hexagonal head 36 as shown in FIG. 10.

FIGS. 12 and 13 show, generally at 55, another locking plate. It is formed of spring steel and has a raised central portion 56 to provide the Belleville washer effect. There is a central aperture 57 to receive the threaded member 35, preferably in the form of a grease fitting. Arms 58 extend radially from the central portion 56 and have upstanding flanges 59 from generally radial edges 60. The flanges 59 are arranged to engage flatwise juxtaposed flat sides 20 of the hexagonal heads 19 of the capscrews 17 and have vertical notches 61 for engaging juxtaposed corners 21 of the heads 19.

To provide greater latitude in the final positions of the hexagonal heads 19, intermediate short arms 62 extend radially from the central portion 56 between the radial arms 58. The arms 62 having upstanding ends 62' that are arranged to engage flatwise against juxtaposed flat sides 20 of the hexagonal heads 19 of the capscrews 17. Vertical notches 63 are formed in the upstanding ends 62' to engage juxtaposed corners 21 of the heads 19.

Ribs 64 are formed in the radial arms 58 along their distal ends to reinforce them and more securely lock the capscrews 17 against turning.

What is claimed as new is:

1. The combination with a roller bearing end cap and three equiangularly spaced hexagonal headed capscrews extending through said end cap of locking means for said capscrews comprising:

a locking plate having a central section and three generally radially extending arms engaging said heads of said capscrews to hold them against turning, and means securing said central section to said end cap.

2. Locking means according to claim 1 wherein:

said locking plate is formed of resilient metal, and said central section is bowed away from said end cap and is adapted to be stressed by said securing means.

3. Locking means according to claim 2 wherein:

said central section has an aperture, and said securing means comprises a threaded member extending through said aperture into said endcap.

4. Locking means according to claim 3 wherein said threaded member is a grease fitting.

5. Locking means according to claim 1 wherein each of said arms has:

a lateral extension from said central section to bear against a flat side of the juxtaposed head of the respective capscrew, and an outstanding distal end to overlie said head.

6. Locking means according to claim 5 wherein each lateral extension has a recess to receive a corner of the respective capscrew.

7. Locking means according to claim 1 wherein three wedge-shaped leaves extend radially from said central section between said arms for locating said locking plate with respect to said heads of said capscrews.

8. The combination with a roller bearing end cap and three equiangularly spaced hexagonal headed capscrews extending through said end cap of locking means for said capscrews comprising:
- a locking plate having a central section and three radially extending wedge-shaped arms having upturned flanges along the radial edges thereof bearing against the flat sides of the heads of the juxtaposed pair of capscrews to hold them against turning, and
- means securing said central section to said end cap.

9. Locking means according to claim 8 wherein:
- said locking plate is formed of resilient metal, and
- said central section is bowed away from said end cap and is adapted to be stressed by said securing means.

10. Locking means according to claim 9 wherein:
- said central section has an aperture, and
- said securing means comprises a threaded member extending through said aperture into said end cap.

11. Locking means according to claim 10 wherein said threaded member is a grease fitting.

12. Locking means according to claim 8 wherein the ends of said flanges bearing against said heads of said capscrews are serrated to receive a corner of the respective hexagonal head in locking engagement.

13. Locking means according to claim 8 wherein said flanges have locking engagement with said heads of said capscrews located at different radii from the center of said end cap.

14. Locking means according to claim 13 wherein the ends of said flanges bearing against said heads of said capscrews are serrated to receive a corner of the respective hexagonal head in locking engagement.

15. Locking means according to claim 10 wherein:
- said threaded member has a head with a plurality of flat sides and corners, and
- said central section of said locking plate has an up-struck tab arranged to be deformed into locking engagement with said head.

16. Locking means according to claim 15 wherein the distal ends of said flanges are serrated to receive a corner of the respective hexagonal head in locking engagement.

17. Locking means according to claim 8 wherein at least one arm extends radially from said central section between a pair of said wedge-shaped arms for locking engagement with a head of one of said capscrews.

18. Locking means according to claim 8 wherein relatively short arms extend radially from said central section between said wedge-shaped arms for locking engagement with said heads of said capscrews.

19. Locking means according to claim 18 wherein said upturned flanges of said wedge-shaped arms
- are notched to receive corners of said hexagonal heads of said capscrews, and
- each of said relatively short arms has an upstanding notched distal end for engaging a flat side or a corner of the juxtaposed hexagonal heads of said capscrews.

20. Locking means according to claim 8 wherein said arms are provided with reinforcing ribs along the distal edges thereof.

* * * * *